United States Patent [19]
Sekine et al.

[11] Patent Number: 6,101,188
[45] Date of Patent: Aug. 8, 2000

[54] INTERNETWORKING ROUTER

[75] Inventors: Minoru Sekine; Akihiko Akitaya, both of Tokyo, Japan

[73] Assignee: NEC Corporation, Tokyo, Japan

[21] Appl. No.: 08/927,092

[22] Filed: Sep. 10, 1997

[30]     Foreign Application Priority Data

Sep. 12, 1996 [JP] Japan .................................. 8-241922

[51] Int. Cl.$^7$ ........................ H04L 12/28; H04L 12/66; H04L 12/56
[52] U.S. Cl. ........................ 370/401; 370/255; 370/353; 370/397; 709/220
[58] Field of Search .................................. 370/218, 255, 370/352, 232, 353, 392, 397, 401, 469; 709/220, 238; 710/38

[56]     References Cited

U.S. PATENT DOCUMENTS

| | | |
|---|---|---|
| 5,088,090 | 2/1992 | Yacoby . |
| 5,151,897 | 9/1992 | Suzuki .................................. 370/401 |
| 5,790,541 | 8/1998 | Patrick et al. ......................... 370/392 |
| 5,933,412 | 8/1999 | Choudhury et al. ................... 370/218 |

FOREIGN PATENT DOCUMENTS

WO 95/01023   1/1995   WIPO .

OTHER PUBLICATIONS

"Virtual LANs Get Real Ethernet Switch Makers Are Taking The Lead in Deploying Virtual LANs Across Campus Networks", Mar. 1995, vol. 24, No. 3, pp. 87–92, 94,96,98 and 100, Data Communications, New York, US.

"Information technology—Telecommunications and information exchange between systems—Local area networks—Media access control (MAC) bridges"—*International Standard*ISO/IEC 10038 : ANSI/IEEE Std 802.1D, 1993 edition, pp. 17–179.

*Primary Examiner*—Hassan Kizou
*Assistant Examiner*—John Pezzlo
*Attorney, Agent, or Firm*—Young & Thompson

[57]          ABSTRACT

The object of the present invention is to accommodate physical segments of LANs into a switching hub substituting them for virtual LANs without modifying software of terminals or setting of the terminal and provide a routing function of the third layer without deteriorating the degree of freedom in virtual LAN setting of the switching hub. The internetworking router of the present invention includes LAN controlling means 1, packet memory 2, bridge processing means 3, table memory 4, routing processing means 5, table memory 6, free buffer queue 7, reception buffer queue 8 and transmission buffer queue 9 between LAN controlling means 1 and bridge processing means 3, and reception buffer queue 10 and transmission buffer queue 11 between bridge processing means 3 and routing processing means 5. Table memory 4 includes bridge group table 41 and address learning tables $42_1$ to $42_n$. Table memory 6 includes routing table 61 and ARP table 62.

3 Claims, 11 Drawing Sheets

| PORT NUMBER | GROUP IDENTIFIER |
|---|---|
| 1 | A |
| 2 | A |
| 3 | B |
| 4 | B |
| 5 | B |
| 6 | B |
| 7 | A |
| 8 | C |
| 9 | C |
| 10 | C |
| 11 | C |
| 12 | A |

FIG. 9

| MAC ADDRESS | PORT NUMBER | AGING COUNTER |
|---|---|---|
| 00-00-0C-00-00-01 | 1 | 20 |
| 00-00-0F-00-11-01 | 2 | 10 |
| 00-00-0F-00-11-C0 | 1 | 30 |
| 00-00-0F-00-21-00 | 12 | 25 |
| ⋮ | ⋮ | ⋮ |
| 00-00-0F-00-35-01 | 1 | 2 |

| DESTINATION NETWORK ADDRESS | NEXT HOP IP ADDRESS | PORT NUMBER | METRIC | AGE |
|---|---|---|---|---|
| 133.206.46.0 | 0 | 301 | 0 | 180 |
| 133.206.62.0 | 0 | 302 | 0 | 175 |
| 133.206.50.0 | 0 | 303 | 0 | 160 |
| 1.0.0.0 | 126.206.50.254 | 303 | 2 | 160 |
| 2.0.0.0 | 126.206.50.253 | 303 | 2 | 160 |
| 133.206.80.0 | 126.206.46.254 | 301 | 2 | 180 |
| ----- | ----- | ----- | ----- | ----- |

FIG. 12

| IP ADDRESS (NETWORK ADDRESS) | MAC ADDRESS (HARDWARE ADDRESS) | AGE |
|---|---|---|
| 133.206.46.254 | 00-0C-01-02-03-04 | 10 |
| 133.206.62.20 | 00-0C-01-05-06-07 | 15 |
| 133.206.50.253 | 00-0C-FF-01-01-01 | 20 |
| ---- | ---- | ---- |

INTERNETWORKING ROUTER

BACKGROUND OF THE INVENTION

1. Field of the Invention

The present invention relates to a switching hub apparatus for switching a MAC (Media Access Control) frame of the second layer, and more particularly to a switching hub apparatus of the composite type having a virtual LAN function and a router function.

2. Description of the Related Art

Conventionally, virtual LAN functions provided by a switching hub of the type mentioned are normally realized dividing in groups in units of a port, searching a learning table from a destination MAC address to discriminate an output port and transmitting a frame if an input port and the output port belong to the same group, but abandoning the frame if the input port and the output port do not belong to the same group.

In the method described above, the learning table for mapping MAC addresses to output ports are managed in a centralized fashion in the apparatus, and if the same MAC address is learned between ports, it is determined that the terminal has moved. Then, the last learned port is mapped to the MAC address, and a packet to be relayed is relayed in accordance with the mapping information.

The first problem of the prior art described above resides in that, if terminals in different virtual LANs (bridge groups) in the same apparatus have used the same MAC address, then communication with those terminals becomes unstable, and in an extreme case, communication is disabled.

That is, some of conventionally used network protocols have a mechanism which presupposes a local address and automatically rewrites an interface address not into a global MAC address but into a unique local address to be used. A router which relays a network of the type just described assigns a same local MAC address to two or more interfaces. Accordingly, if the router is connected between virtual LANs, such a situation that the same MAC address is connected in a plurality of virtual LANs occurs. In such a construction, a stable relaying operation cannot be expected.

The reason is described below. In the method described above, the table for mapping MAC addresses to output ports is managed in a centralized fashion in the apparatus, and a MAC address is learned and stored together with a port which was received last. Since this mechanism operates independently of the construction of the virtual LANs, when different groups have terminals having the same MAC address, entry of the table is performed based on a result of learning such that a port connected to a terminal which has outputted a frame last is mapped and stored as a port to which the MAC address is connected. When a frame destined for a terminal having the MAC address is received, to which one of the ports the frame is to be transferred depends upon the learning state of the table.

Accordingly, if, during communication between terminals A1 and A2 which belong to group A, terminal B1 having the same MAC address as terminal A1 begins communication in group B, under certain circumstances, such a situation occurs that a frame destined for terminal A1 from terminal A2 is transferred to a port learned with terminal B1. Since this frame is abandoned because it has been sent to a wrong group, it is considered that the frame is not received by terminal B1. However, such a situation that the frame is not transferred to terminal A1 occurs. Further, even if terminal A2 resends the frame, the situation in which transfer of a packet to terminal A1 does not take place, unless time-out of the learning table occurs or terminal A1 issues a new packet, does not change. If terminal A1 uses an ordinary interactive protocol, since it often occurs that terminal A1 continues to wait for a response from terminal A2, restarting of communication cannot be much expected, and communication between applications is interrupted.

The second problem of the prior art resides in that, if a switching hub constructing virtual LANs has a traffic of the third layer which spans a plurality of virtual LANs, since relaying is impossible with just a bridge function, an external router of the third layer is required.

For example, if a virtual LAN "A" and another virtual LAN "B" are set to a switching hub and have networks having different IP (Internet Protocol) subnetworks respectively, terminals of the virtual LANs "A" and "B" need not communicate with each other very much in an ordinary client-server application. However, for electronic mail or the like, routing must be performed which exceeds that of an IP sub-network. For this purpose, virtual LANs may be connected to each other by a router outside a switching hub. Generally, however, when virtual LANs are connected to each other by an external router, a high cost is required and the flexibility in modification of a network is deteriorated.

The reason is described below. An external router for connecting virtual LANs to each other is required to connect at least one physical interface for each virtual LAN. As the number of virtual LANs increases, also a corresponding increased number of physical interfaces are required, but generally a multi-port router is very expensive. Further, as the number of virtual LANs increases or decreases, the number of physical ports of the router must be increased or decreased, and although recombination of virtual LANs can be performed simply by using a switching hub, operationally this is not advantageous because it imposes restrictions on the router.

SUMMARY OF THE INVENTION

It is an object of the present invention to accommodate physical segments of conventional LANs into a switching hub substituting them for virtual LANs without modifying software of terminals or settings of the terminal and provide a routing function of the third layer without deteriorating the degree of freedom in virtual LAN settings of the switching hub.

In order to attain the object described above, according to the present invention, there is provided an internetworking router for a LAN switching hub apparatus which includes an address learning table which holds as a set for a certain period of time a source second layer address for a packet received from a plurality of LAN interfaces and the LAN interface of the plurality of LAN interfaces which has received the packet, wherein a destination second layer address is extracted from the received packet and the address learning table is searched using the destination second layer address as a key to specify a LAN interface which corresponds to the destination second layer address from within the plurality of LAN interfaces, and then the packet is relayed and sent out only to the specified LAN interface, constructed such that the internetworking router has a plurality of bridge groups which construct a plurality of virtual LANs by arbitrarily combining those of the plurality of LAN interfaces which can be relayed to each other, that the plurality of bridge groups have address learning tables for relaying process independently of each other, and that bridge processing means causes the address learning table of the one of the plurality of bridge groups to which the received packet belongs to perform learning processing.

Consequently, the uniqueness of a MAC address between different bridge groups need not be secured. That is, since an independent address learning table is maintained for each virtual LAN, when an entry of a MAC address used in a virtual LAN "A", for example, "00-00-4c-12-34-56", is present in learning table A, even if a packet from a terminal having an entry of address "00-00-4c-12-34-56" is received to another virtual LAN "B", the entry of learning table A is not influenced by the reception, but merely a new entry of address "00-00-4c-12-34-56" is produced in learning table B. Accordingly, such a situation that a packet destined for "00-00-4c-12-34-56" transferred to the virtual LAN "A" is conveyed to a port learned by the virtual LAN "B" and abandoned because the virtual LAN is a wrong one occurs.

The internetworking router of the present invention described above may be constructed such that the internetworking router includes a plurality of logical interfaces including virtual LAN interfaces and routing processing means for relaying the plurality of logical interfaces, and, when the packet is to be relayed between a first bridge group and a second bridge group from among the plurality of bridge groups, a third logical interface for relaying the first bridge group and the second bridge group from among the plurality of logical interfaces delivers address pointer information to a buffer into which the packet has been stored using a port ID of the virtual LAN interface between the bridge processing means and the routing processing means.

When the third logical interface from among the plurality of logical interfaces is to deliver the address pointer information to the buffer into which the packet has been stored using the port ID of the virtual LAN interface between the bridge processing means and the routing processing means, the address pointer information may be delivered in a multiplexed state into a reception buffer queue or a transmission buffer queue.

Consequently, the internetworking router can cope flexibly with increase or decrease in number of virtual LANs. That is, even if the set number of virtual LANs is increased or decreased, since this merely increases the number of bridge group IDs, the connection to the routing processing means is limited purely by the size only of tables to be produced by software, and additional equipment of new hardware or modification to the connection of hardware is no longer required.

From the foregoing, in the internetworking router of the present invention, conventional physical LAN segments can be moved to a virtual LAN environment provided by the internetworking router of the present invention including local addresses or a kind of a protocol being used using local MAC addresses without effecting modification to settings at the terminal at all.

The reason is that, since each address learning table of a MAC address is maintained independently in units of a bridge group of the second layer constructing virtual LANs and the bridge processing means causes each address learning table to perform learning process for each bridge group (virtual LAN) to which a packet belongs, a same MAC address in cases when bridge groups (virtual LANs) are different can be managed as different terminals simultaneously as different address learning tables, and the uniqueness of a MAC address between different bridge groups need no longer be secured and the uniqueness of a MAC address must be secured only in a virtual LAN, and accordingly, this way of thinking is equivalent to conventional physical LAN segments.

Further, in the internetworking router of the present invention, the flexibility in virtual LAN setting is augmented and the cost for a network can be suppressed.

The reason is that, when the connection between the bridge processing means and routing processing means is multiplexed adding an identifier of a virtual LAN as an interface in the same apparatus, even if the set number of virtual LANs is increased or decreased, the connection to the routing processing means is limited purely by the size of tables to be produced by software while only the number of bridge group IDs is increased, and accordingly, additional equipment of hardware to or modification to the connection of the routing processing means caused by increase or decrease of the set number of virtual LANs becomes unnecessary. In other words, this is because address pointer information to a buffer in which a packet received using a port ID is stored is delivered between the bridge processing means and the routing processing means to physically multiplex it with a reception buffer queue and a transmission buffer queue to realize virtual LAN ports in the internetworking router.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 9 is a view showing a structure of a bridge group table in the embodiment of the present invention;

FIG. 10 is a view showing a structure of an address learning table in the embodiment of the present invention;

FIG. 11 is a view showing a structure of a routing table in the embodiment of the present invention; and FIG. 12 is a view showing a structure of an ARP table (Address Resolution Protocol Table) in the embodiment of the present invention.

DETAILED DESCRIPTION OF THE PREFERRED EMBODIMENT

Figure 1:
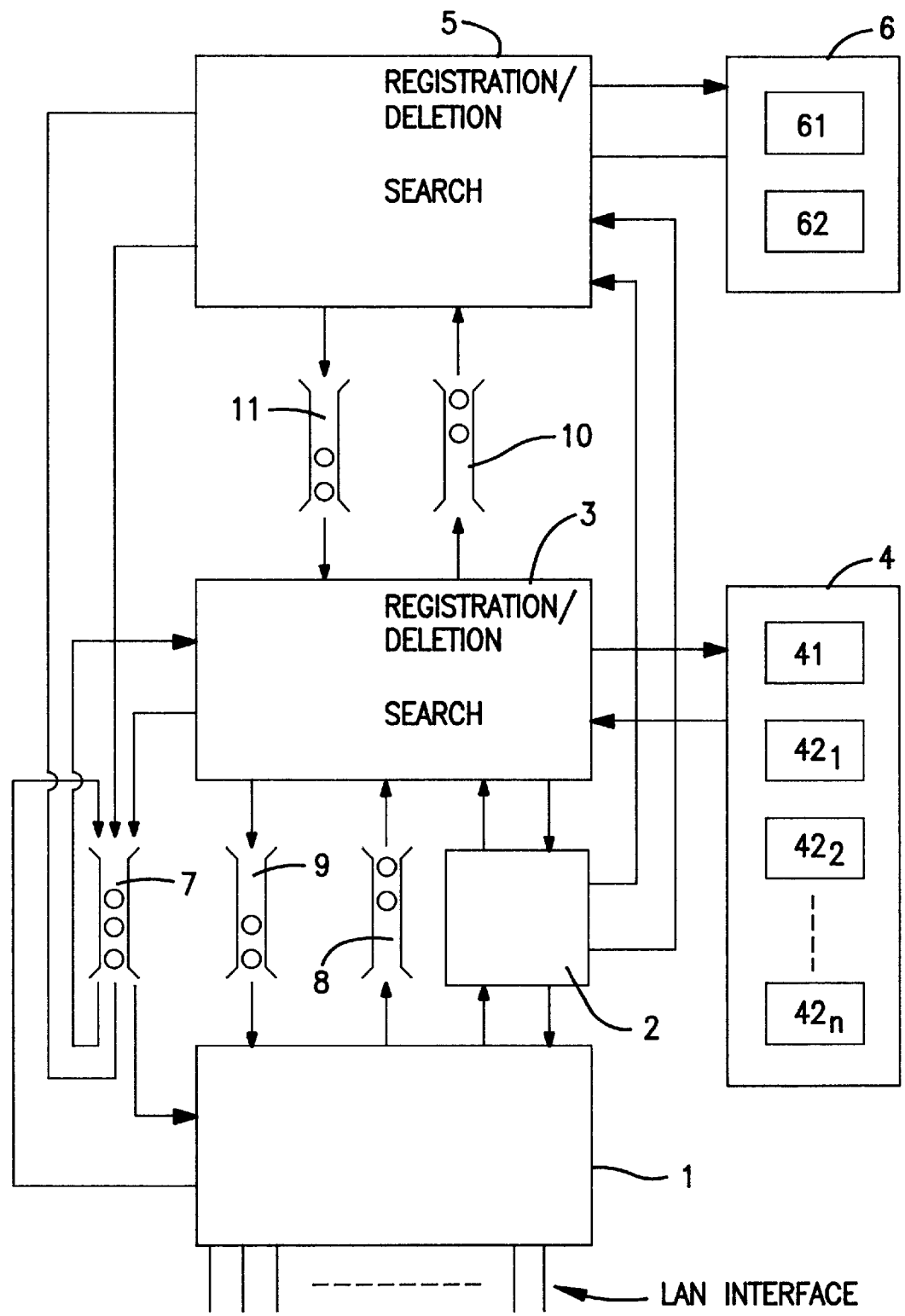
FIG. 1 is a block diagram showing a construction of an internetworking router according to an embodiment of the present invention.

An embodiment of the present invention is described in detail below with reference to the drawings.

A construction of the embodiment of the present invention is described with reference to FIG. 1. The internetworking router shown in FIG. 1 includes LAN controlling means 1, packet memory 2, bridge processing means 3, table memory 4 of bridge processing means 3, routing processing means 5, table memory 6 of routing processing means 5, free buffer queue 7, reception buffer queue 8 and transmission buffer queue 9 between LAN controlling means 1 and bridge processing means 3, and reception buffer queue 10 and transmission buffer queue 11 between bridge processing means 3 and routing processing means 5.

LAN controlling means 1 includes a plurality of LAN interfaces, and performs transmission-reception control of packets of the LAN interfaces and transmits and receives reception data to and from packet memory 2. Bridge processing means 3 relays and exchanges packet data of packet memory 2 in a data link layer (second layer) in accordance with a second layer address. Table memory 4 stores second layer address information to be registered, deleted or referred to for relaying and exchanging by bridge processing means 3. Routing processing means 5 performs routing of packet data relayed from bridge processing means 3 on packet memory 2 in accordance with a third layer network address. Table memory 6 stores third layer network address information to be relayed and exchanged by routing processing means 5. Free buffer queue 7 stores buffer addresses in a non-used state. Reception buffer queue 8 delivers a reception buffer address from LAN controlling means 1 to bridge processing means 3. Transmission buffer queue 9 delivers a transmission buffer address from bridge processing means 3 to LAN controlling means 1. Reception buffer queue 10 delivers a reception buffer address from bridge processing means 3 to routing processing means 5. Transmission buffer queue 11 delivers a transmission buffer address from routing processing means 5 to bridge processing means 3.

Table memory 4 includes bridge group table 41 which allocates each of ports of the LAN interfaces to one of a plurality of bridge groups which are virtual bridges, and address learning tables $42_n$ (n=1, 2, . . . ) provided in a one-by-one relationship in the bridge groups. A bridge group is a group which is regarded as a same virtual LAN in one internetworking router.

Table memory 6 includes routing table 61 for routing control, and ARP table 62 for converting a network address into a hardware address.

Operation of the embodiment of the present invention is described below with reference to FIGS. 1 to 7.

Figure 2:
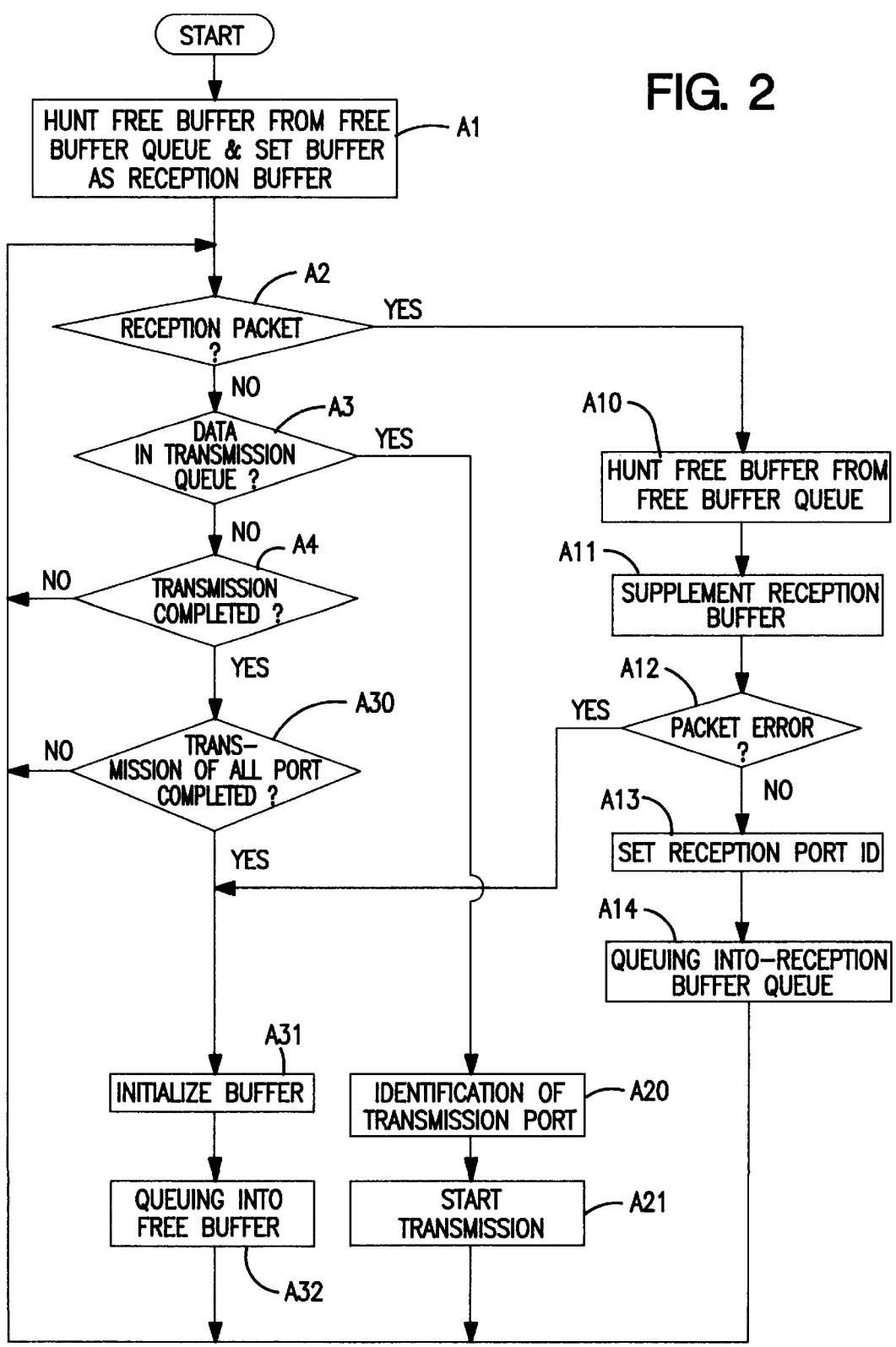
FIG. 2 is a flow chart illustrating operation of LAN controlling means shown in FIG. 1.

Operation of LAN controlling means 1 is described with reference to FIG. 2. LAN controlling means 1 hunts a free buffer address of packet memory 2 from free buffer queue 7 and sets the free buffer address as a destination of storage of data to be received from a LAN interface (step A1). LAN controlling means 1 supervises reception from the LAN interfaces (step A2), and if a reception packet is detected and reception is completed, then the process advances to step A10. If reception is not completed, then LAN controlling means 1 checks whether or not pointer data is present in transmission buffer queue 9 (step A3). If pointer data is present in transmission buffer queue 9, then the process advances to step A20. If pointer data is not present in transmission buffer queue 9, then LAN controlling means 1 checks whether or not completion of transmission has been notified from an LSI which has started the transmission (step A4). If a transmission completion notification is detected, then the process advances to step A30. If no transmission completion notification is detected, then the process returns to step A2.

Data of a packet received from a LAN interface in step A2 is usually DMA (Direct Memory Access) transferred to and stored into the reception buffer of packet memory 2 allocated in step A1 by the function of an LAN controller in the form of an LSI, and is detected by LAN controlling means 1. If completion of reception is detected by LAN controlling means 1, then LAN controlling means 1 newly hunts a free buffer from free buffer queue 7 (step A10), and supplements the hunted free buffer as a reception buffer to the port whose reception buffer has been used so that a certain number of non-used reception buffers may always be secured for each port (step A11).

Then, LAN controlling means 1 checks a reception state of the packet (step A12). If the packet has not been received normally or an error has been detected in contents of the packet, the process advances to step A31, where the packet is abandoned. If the received packet is a normal packet, then in order to notify it to a protocol of an upper layer from which port the packet has been received, an identifier of the port is set to a reception port ID of the buffer (step A13). Then, the pointer to the reception buffer is queued into reception buffer queue 8 and delivered to bridge processing means 3 (step A14).

If pointer data is detected in transmission buffer queue 9 in step A3, LAN controlling means 1 identifies the transmission port ID and decides a transmission destination port (step A20). LAN controlling means 1 notifies, to the LAN controller of the transmission destination port corresponding to the position of the transmission buffer, a command to read out data from the buffer and transmit the data to a LAN segment and an address of a buffer and causes the LAN controller to start transmission (step A21). Thereafter, the process returns to step A2. When a plurality of transmission destination ports are presented, LAN controlling means 1 causes all of the ports to start transmission.

If a transmission completion notification is detected in step A4, then since a plurality of transmission ports may possibly be presented, LAN controlling means 1 checks whether or not transmission of all ports is completed (step A30). If transmission of all ports is not completed, then the process returns to step A2. On the other hand, if transmission of all ports is completed, then LAN controlling means 1 initializes the buffer or buffers which have completed transmission (step A31), and queues the pointer as a free buffer into free buffer queue 7 (step A32).

Figure 3:
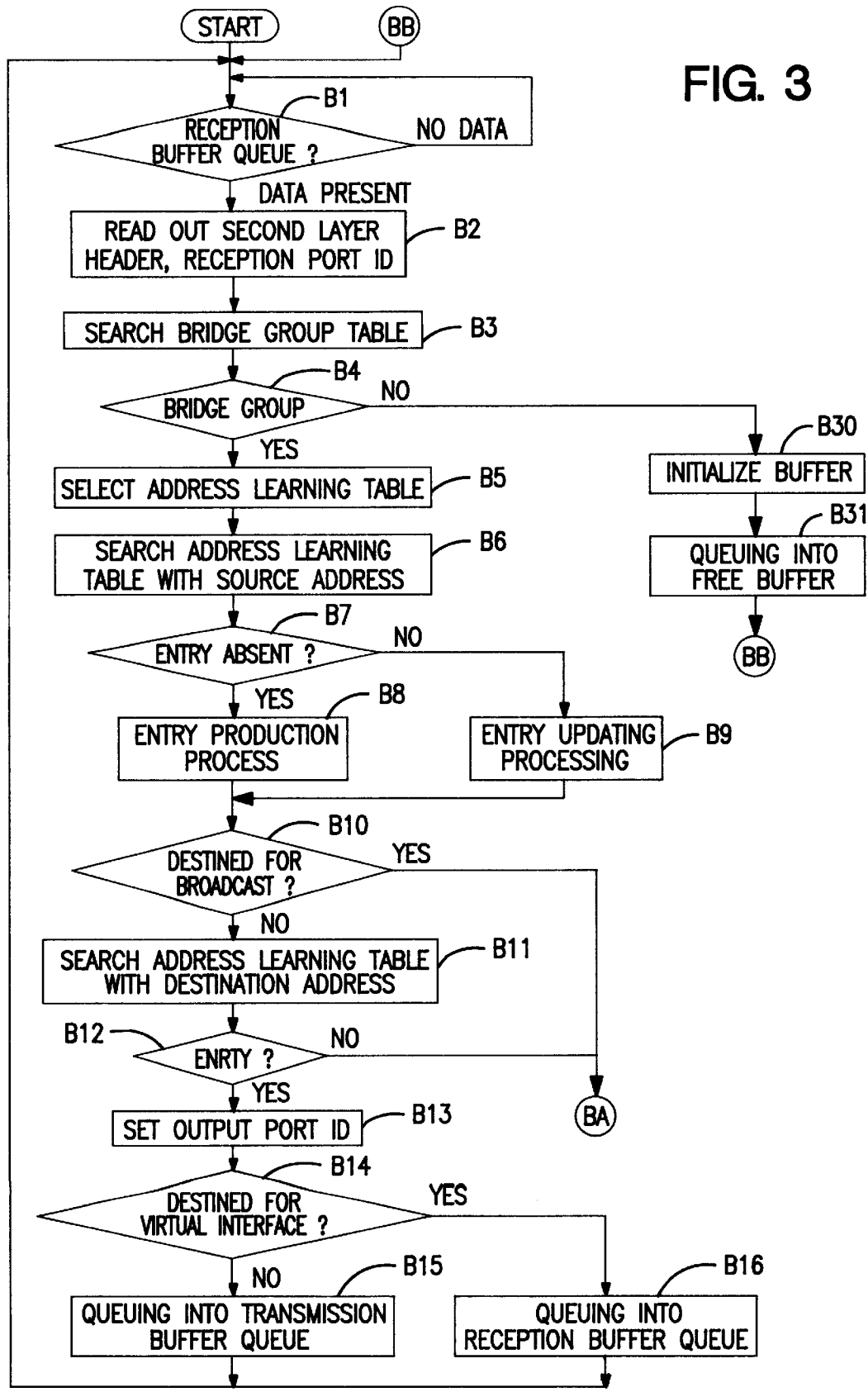
FIG. 3 is a flow chart illustrating operation of bridge processing means shown in FIG. 1.
Figure 4:
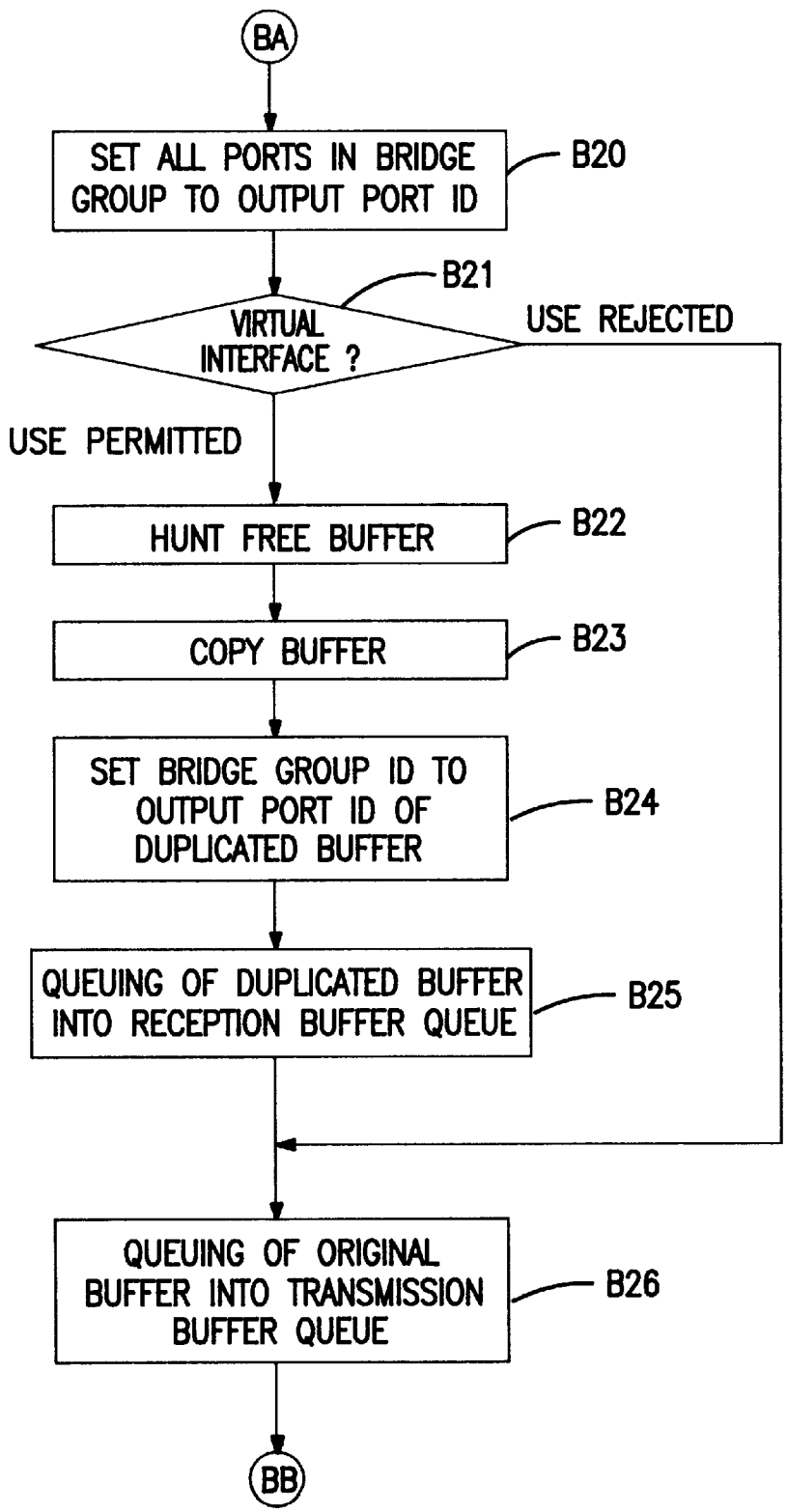
FIG. 4 is a flow chart illustrating operation of the bridge processing means shown in FIG. 1.

Relaying process of bridge processing means 3 is described with reference to FIGS. 3 and 4. Bridge processing means 3 scans reception buffer queue 8 periodically or by an interruption (step B1), and if data is present in reception buffer queue 8, then bridge processing means 3 reads out a reception buffer pointer and reads out a second layer protocol header including a second layer destination address and a second layer source address and a reception port ID from the buffer indicated by the reception buffer pointer (step B2). Bridge processing means 3 searches bridge group table 41 using the read out reception port ID as a key (step B3) and identifies a bridge group to which the port which has received the packet belongs (step B4). If the pertinent port is not detected in bridge group table 41, then bridge processing means 3 determines that the packet has been inputted from an wrong or non-set port, and advances the process to step B30, in which bridge processing means 3 abandons the packet.

If the pertinent port is detected in bridge group table 41, then bridge processing means 3 selects address learning table $42_m$ (m=1, 2, . . . , n) corresponding to the identified bridge group in table memory 4 (step B5). Bridge processing means 3 searches selected address learning table $42_m$ using the second layer source address as a key (step B6) and checks whether or not the pertinent entry is detected in address learning table $42_m$ (step B7).

If a pertinent entry is not detected, then bridge processing means 3 produces a new entry and performs address learning process to register the second layer address, the reception port ID and an age counter initial value (step B8). If the pertinent entry is detected, then bridge processing means 3 sets the reception port ID again and performs updating process of the entry to reset the age counter to the initial value (step B9). In this instance, since address learning table $42_m$ is managed independently for each bridge group, different bridge groups may simultaneously include a same address. This entry can be performed separately for each bridge group.

Then, bridge processing means 3 judges whether or not the second layer destination address is a broadcast address (step B10). If the second layer destination address is a broadcast address, then the process jumps to step B20. If the second layer destination address is not a broadcast address, then bridge processing means 3 searches address learning table $42_m$, which has been identified formerly, again using the second layer destination address as a key (step B11), and judges whether or not there is an entry (step B12). If no entry is detected, then since the destination address is in a not-learned state, it cannot be decided to which port the packet should be outputted. Accordingly, in order to perform flooding for transmitting to all ports which form the same bridge group, the process advances to step B20. If an entry is detected, then since a port to which the pertinent terminal of the second layer address is connected can be identified uniquely, bridge processing means 3 sets the reception port ID learned in address learning table $42_m$ to the output port ID of the buffer (step B13).

Then, bridge processing means 3 judges whether or not the set port ID is a bridge group ID for a virtual interface destined for routing processing means 5 (step B14). If the port ID is not a bridge group ID, then since the packet should be sent not to routing processing means 5 but to LAN controlling means 1, bridge processing means 3 queues a pointer to the buffer into transmission buffer queue 9 (step B15) and performs a request to send, and then the process returns to step B1. If the port ID is a bridge group ID, then since the packet should be sent to routing processing means 5, bridge processing means 3 queues the pointer to a buffer into reception buffer queue 10 (step B16).

If it is judged in step B10 that the second layer destination address is a broadcast address or if it is judged in step B12 that an entry which coincides with the second layer destination address is not detected in the learning table, then bridge processing means 3 sets all ports which belong to the same bridge group to the transmission port ID (step B20). Then, bridge processing means 3 judges whether or not connection of the bridge group to routing processing means 5 is inhibited by setting of the user (step B21). If the connection is inhibited, then the process advances to step B26. If connection to routing processing means 5 is not inhibited, then bridge processing means 3 hunts a free buffer from free buffer queue 7 (step B22), copies the received packet into the free buffer to produce a duplicate (step B23), sets the bridge group ID to the transmission port ID of the newly duplicated buffer (step B24), and queues the pointer into reception buffer queue 10 (step B25). Then, bridge processing means 3 queues the pointer to the original packet buffer into transmission buffer queue 9 (step B26) and then returns the process to step B1.

Since a packet for which a bridge group has not been identified is abandoned in step B4, bridge processing means 3 initializes the buffer (step B30) and queues the pointer into free buffer queue 7 so that the buffer may be regarded as a free buffer (step B31). Thereafter, the process returns to step B1.

Bridge processing means 3 performs aging process for maintenance and management of address learning tables 42 at intervals of a certain time independently of packet learning and relaying process. The aging process is a function of deleting, from among entries learned in address learning tables 42, any entry with which a certain time has elapsed.

Figure 5:
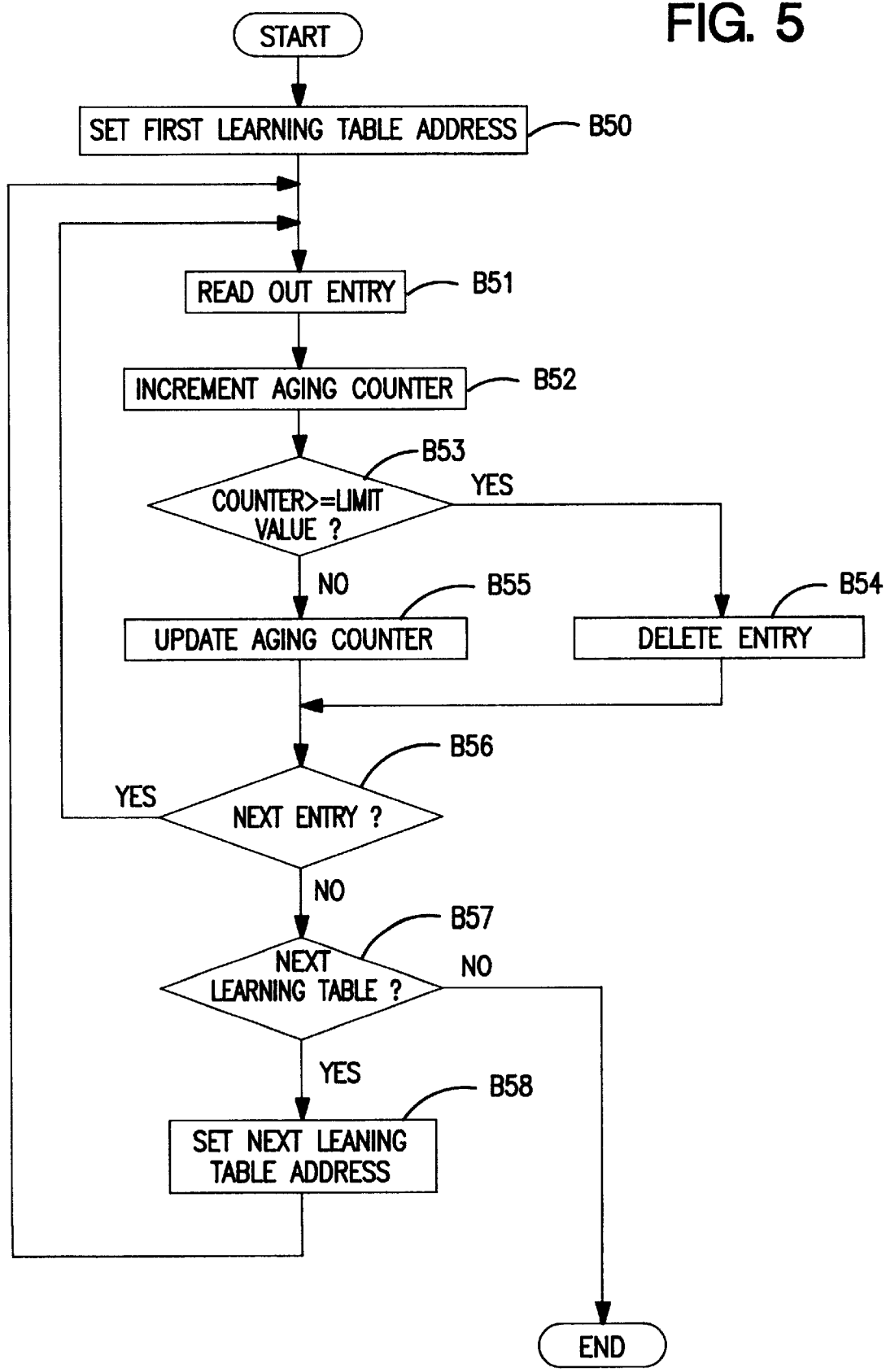
FIG. 5 is a flow chart illustrating operation of the bridge processing means shown in FIG. 1.

The aging process of bridge processing means 3 is described with reference to FIG. 5. An aging processing program is started at intervals of a certain time using an interval timer or the like. After the aging processing program is started, bridge processing means 3 sets the address of a first one of the plurality of address learning tables 42 of table memory 4 (step B50), reads out entries in order from the first address learning table (step B51) and increments the age counter for the read out entry by one (step B52). While this example is an example of realization when an incrementing counter is used, a decrementing counter can be used equivalently in principle.

Then, bridge processing means 3 checks whether or not a result of the incrementing is equal to an allowable value of the age counter (a predetermined maximum time in which an entry can be held) (step B53). If the result of the incrementing is equal to or larger than the allowable value, then bridge processing means 3 deletes the entry (step B54). However, if the result of the incrementing is smaller than the allowable value, then bridge processing means 3 writes the result of the incrementing into the table to update the entry (step B55).

Bridge processing means 3 judges whether or not there is a next entry (step B56). If a next entry is detected, then the process returns to step B51. If a next entry is not detected, then bridge processing means 3 judges whether or not there is a next address learning table (step B57). If there is a next address learning table, then bridge processing means 3 sets the address to a first entry of the address learning table (step B58), and then returns the process to step B51. If process for all of the address learning tables is completed, then the aging processing program is ended.

Figure 6:
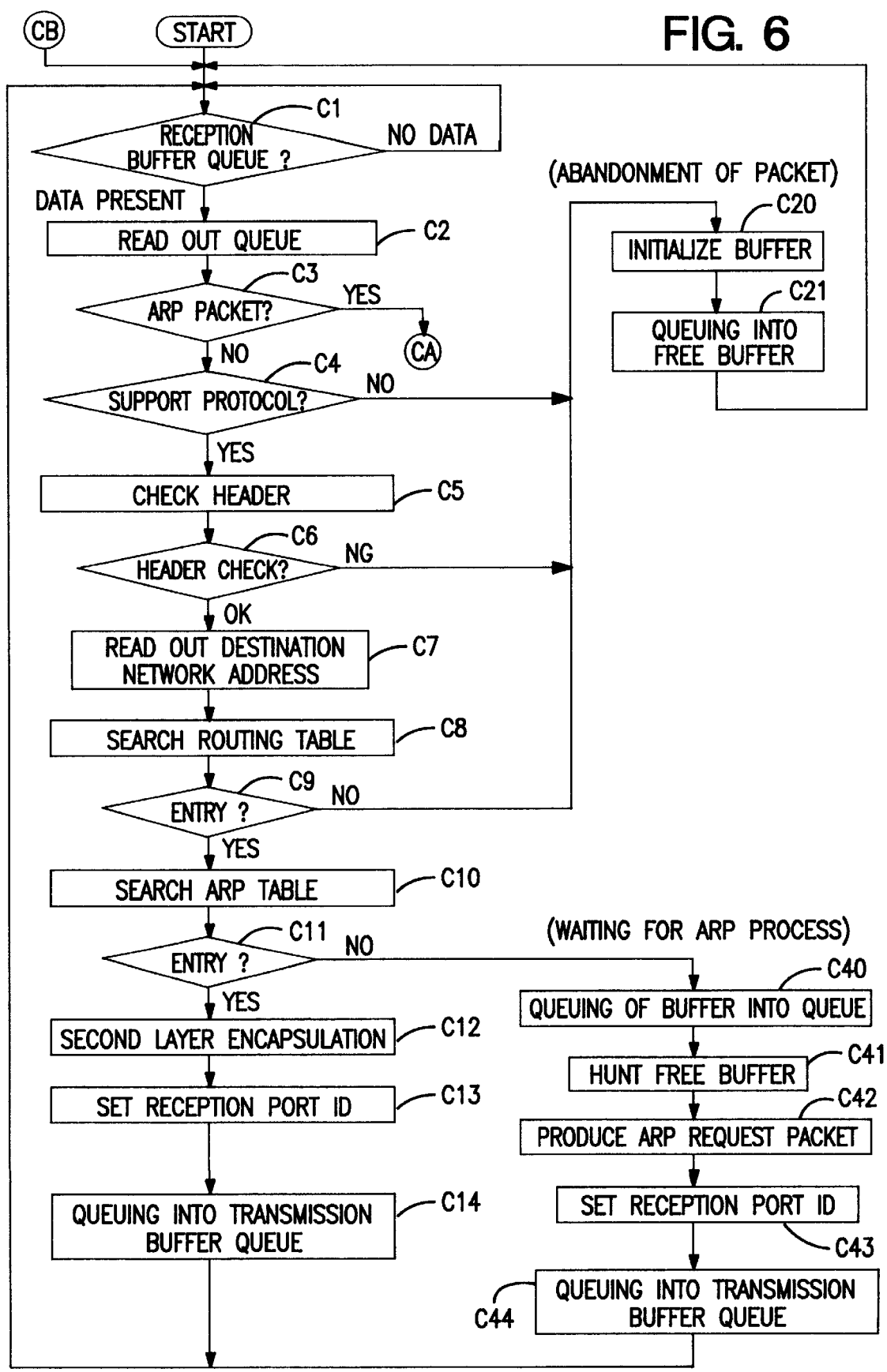
FIG. 6 is a flow chart illustrating operation of routing processing means shown in FIG. 1.
Figure 7:
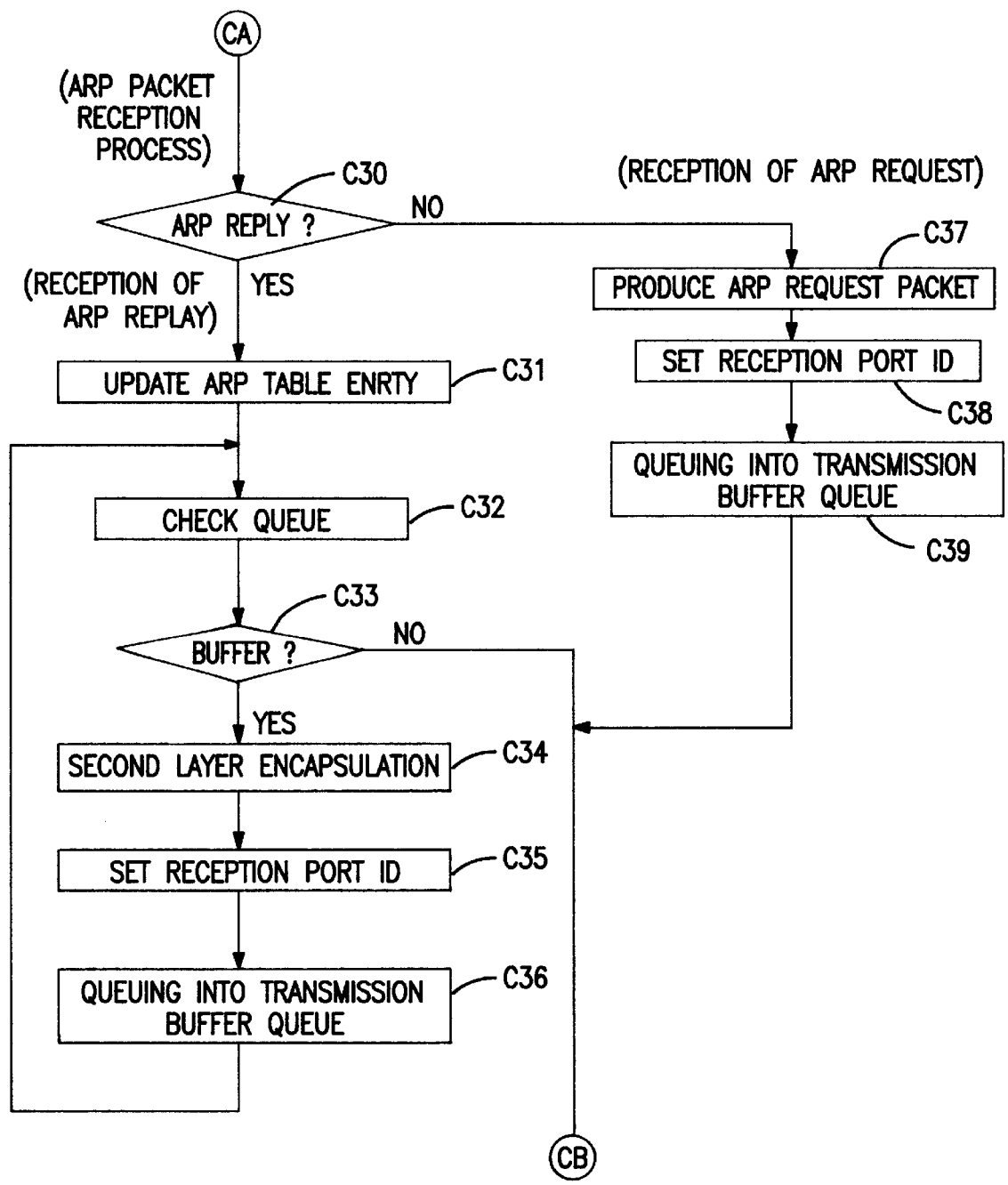
FIG. 7 is a flow chart illustrating operation of the routing processing means shown in FIG. 1.
Figure 8:
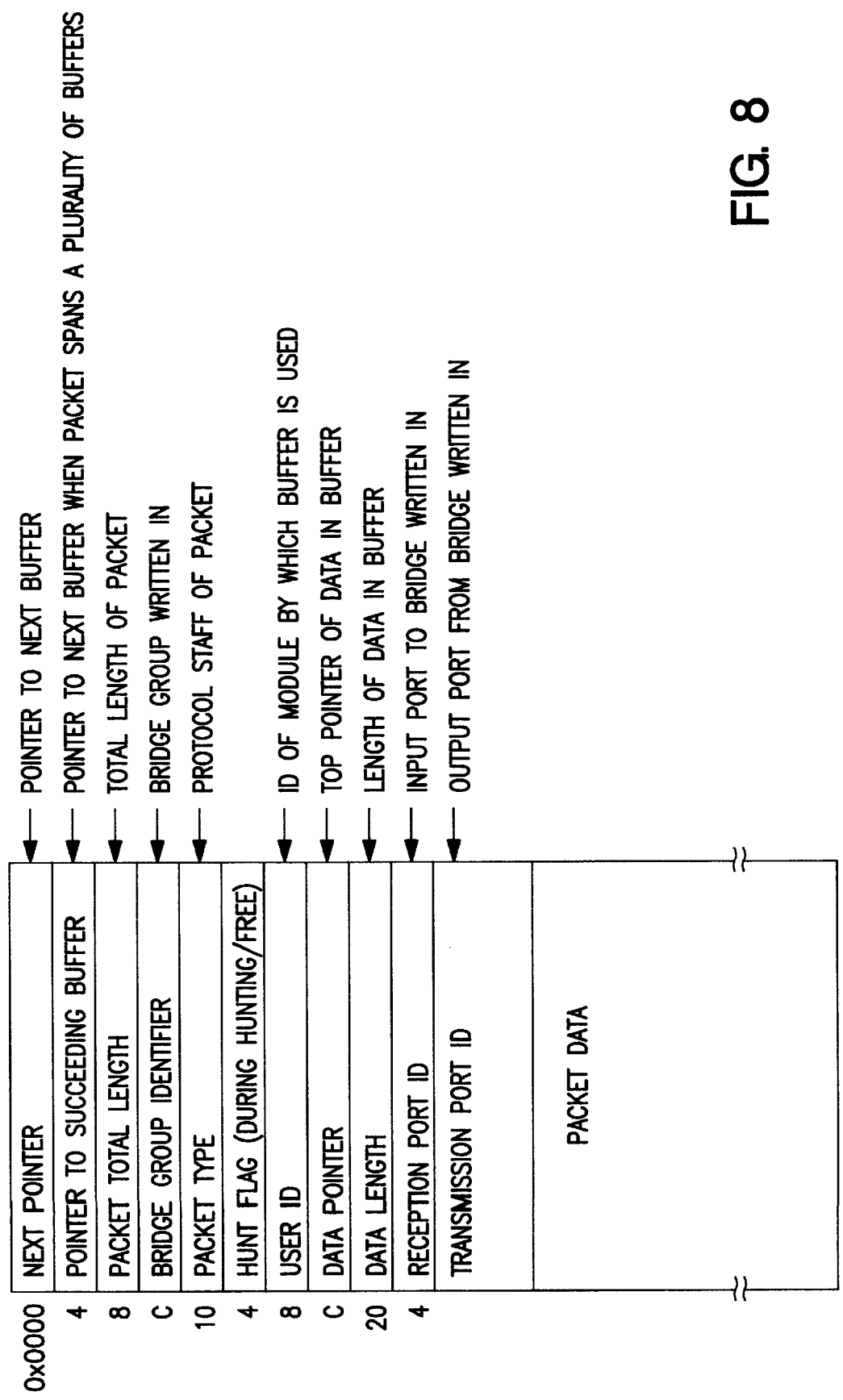
FIG. 8 is a view showing a structure of a packet buffer in the embodiment of the present invention.

Operation of routing processing means 5 is described with reference to FIGS. 6 and 7. Routing processing means 5 scans reception buffer queue 10 periodically or by interruption process (step C1), and if no data is detected in reception buffer queue 10, then step C10 is repeated. If data is detected in reception buffer queue 10, then routing processing means 5 reads out the data (step C2) and refers to the second layer header part of reception packet data from the read out address to a reception buffer to judge whether or not the packet is an ARP request or an ARP reply from a protocol type field of the second layer (step C3). If the packet is an ARP packet, then the process advances to step C30, in which routing processing means 5 performs ARP reception process. If the packet is not an ARP packet, then routing processing means 5 checks whether or not the protocol type of the packet is a network layer protocol supported by routing processing means 5 (step C4), and if the protocol type of the packet is not the supported protocol, then the process advances to step C20, in which process of abandoning the packet is performed.

If the protocol type of the packet is a protocol supported by routing processing means 5, then routing processing means 5 reads out and checks the third layer protocol header (step C5) and then checks whether or not the header is normal and whether or not the header satisfies requirements for routing (step C6). When the header is not normal or the requirements for routing are not satisfied, routing processing means 5 determines that routing is impossible and advances the process to step C20, in which process of abandoning the packet is performed. If the header is normal and the requirements for routing are satisfied, then since routing is possible, routing processing means 5 uses the third layer destination network address as a key (step C7) to search routing table 61 of table memory 6 to obtain a next hop network layer address and an interface identifier to be outputted (step C8). Here, since the interface identifier is used for identification of a virtual interface between bridge processing means 3 and routing processing means 5 and one interface identifier is provided for each one bridge group, it can be used for identification of a bridge group ID.

Routing processing means 5 searches routing table 61 to check whether or not it includes a pertinent network address entry (step C9). If the pertinent network address entry is not detected in routing table 61, then the process advances to step C20, in which process of abandoning the packet is performed. If the pertinent network address entry is detected in routing table 61 and a next hop network layer address is obtained, then routing processing means 5 searches ARP table 62 using the next hop network layer address as a key to obtain a corresponding second layer address (step C10). Routing processing means 5 checks whether or not the second layer address is cached in ARP table 62 (step C11). If the second layer address is not cached in ARP table 62, then the process advances to ARP process defined for each type of a network in step C40 and the following steps.

If the second layer address is cached in ARP table 62, then routing processing means 5 produces a second layer protocol header in which the obtained second layer address is set as a destination and the second layer address assigned to routing processing means 5 is set as a source second layer address, performs encapsulating process in the buffer and performs assembling process of a packet of the second layer (step C12). Then, in order to indicate to which bridge group of bridge processing means 3 the packet should be delivered from routing processing means 5, routing processing means 5 sets the bridge group ID to the reception port ID (step C13), queues it into transmission buffer queue 11 and transmits the packet via bridge processing means 3 (step C14). Thereafter, the process returns to step C1.

In the packet abandoning process, the packet buffer is initialized (step C20), and the pointer address to a buffer is returned to free buffer queue 7 (step C21) thereby to abandon the packet, whereafter the process returns to step C1.

In the ARP process, for a packet for which address resolution process is required, the buffer address is queued into a queue for each next hop network address (step C40), and a free buffer is hunted from free buffer queue 7 (step C41) and an ARP request packet in which the next hop network address is set as a target is produced in the buffer (step C42). Routing processing means 5 sets the bridge group ID to the reception port ID (step C43), and queues the bridge group ID into transmission buffer queue 11 and requests transmission of the ARP request packet via bridge processing means 3 (step C44). Thereafter, the process returns to step C1.

If it is judged in step C3 that the packet is an ARP packet, then routing processing means 5 checks whether or not the reception packet is an ARP reply (step C30), and if the reception packet is not an ARP reply, then the process advances to step C37. If the reception packet is an ARP reply, then routing processing means 5 updates ARP table 62 (step C31) and scans a buffer queued in the queue for the target network address (step C32) and checks whether or not the queued buffer is present (step C33).

If the queued buffer is not present, then the process advances to step C1. If the queued buffer is present, then routing processing means 5 performs second layer encapsulation (step C34), sets the bridge group ID to the reception port ID (step C35), and queues it into transmission buffer queue 11 and requests for transmission via bridge processing means 3 (step C36), whereafter the process returns to step C32. If the process in step C32 and the following steps is repeated until no buffer remains in the queue, then since this signifies that all of the transmission buffers destined for the network address and having waited for ARP process have been processed, the process returns to step C1.

If the reception packet is not an ARP reply in step C30, then since the packet is an ARP request, routing processing means 5 confirms that the target network address is the network address of routing processing means 5 and produces an ARP reply packet, in which the second layer address is set, in the reception buffer (step C37). Then, routing processing means 5 sets the bridge group ID held in the transmission port ID of the request to the reception port ID (step C38), and queues the bridge group ID into transmission buffer queue 11 and requests for transmission via bridge processing means 3 (step C39), whereafter the process returns to step C1.

Working Example

In the following, a working example of the present invention is described in detail with reference to the drawings.

LAN controlling means 1 shown in FIG. 1 includes ethernets, token rings and so forth as a plurality of physical LAN interface ports and has a MAC function for performing communication of a packet with a LAN segment and buffer management functions for supplementing of a buffer for reception for the MAC function, delivery of a transmission buffer, withdrawing of a buffer for which reception has been completed and so forth. The MAC function effects data transfer between a buffer and a LAN line, coding, carrier control and so forth, and for each type of LAN, an LSI is provided based on specifications defined in the IEEE 802.3 standard, IEEE 802.5 standards, ANSI standards, FDDI standards or the like. Here, description is given of a case wherein ethernets having 12 ports are used.

LAN controlling means 1 hunts, in an initial state, a non-used free buffer from free buffer queue 7 and instructs 12 ethernet controller LSIs to individually use free buffers of a certain amount as buffers for storage of reception data.

If packet data is received from a LAN segment, then the reception buffer pointer, by which an ethernet controller LSI is designated, is referred to and the reception data is DMA transferred to an address of the reception buffer memory. Upon completion of the reception (completion of the transfer), reception data management information such as a result of the transfer, presence or absence of an error and so forth is set to a register, a temporary memory for process of a buffer or the like, and a reception notification is sent to LAN controlling means 1. When the reception notification is detected, LAN controlling means 1 hunts a free buffer again from free buffer queue 7 and supplements the free buffer to the ethernet controller which has performed reception. Then, after it is confirmed that the reception packet has no error, a reception port number which indicates from which physical LAN interface port the reception notification has been received is written into a reception port ID field in the reception buffer, and the address pointer to the reception buffer is loaded into reception buffer queue 8. All queues (free buffer queue 7, reception buffer queue 8, transmission buffer queue 9, reception buffer queue 10 and transmission buffer queue 11) are realized using a memory of the first-in first-out (FIFO) type.

If an error occurs upon reception, then the reception buffer is not loaded into reception buffer queue 8, but the reception port ID field in the buffer is initialized into a non-used state and the buffer is loaded into free buffer queue 7, thereby abandoning the packet.

If pointers are detected in transmission buffer queue 9, then LAN controlling means 1 reads out one of the pointers and processes a transmission request from bridge processing means 3. After the transmission buffer pointer is read out from transmission buffer queue 9 into LAN controlling means 1, transmission port IDs in the transmission buffer are checked, and an address of the data part to be transmitted by the transmission buffer is notified to the ethernet controllers corresponding to all of the pertinent ports and a transmission start command is issued. Then, LAN controlling means 1 causes the MAC function managed by the same to start transmission designating a transmission buffer address.

Each of the ethernet controller LSIs caused to start transmission refers to the buffer address in which data are held and DMA transfers the data from packet memory 2 to a LAN line. If the transfer is completed normally, then transmission completion is notified to LAN controlling means 1. However, if the transfer is not completed normally even if the data is resent by a prescribed number of times, then failure of the transmission is notified together with a result of an error. At a point of time at which transmission completion or transmission failure is sent back to all of the ports designated in the transmission port ID, LAN controlling means 1 initializes the buffers and loads the buffers into free buffer queue 7 thereby to release the transmission buffer.

Bridge processing means 3 manages a plurality of LAN interfaces dividing them into several groups. Here, each group is called a bridge group, and between LAN interfaces which belong to the same bridge group, relaying process is performed by bridging. However, no relaying process is performed between different groups. By this function, a so-called virtual LAN can be constructed in the internetworking router.

In the internetworking router, setting of the bridge groups is held, as information set in advance by an operator, in the form of a mapping table between the port numbers and the bridge group identifiers, in advance in bridge group table 41 shown in FIG. 9.

When the address pointer of the reception buffer is received from reception buffer queue 8, bridge processing means 3 identifies, from the packet data field in the reception buffer, a destination MAC address (hereinafter referred to simply as DA) of an ethernet frame and a source MAC address (hereinafter referred to simply as SA), and reads out a reception port ID from the reception port ID field. Since the reception port ID has a received port number written therein, bridge processing means 3 searches bridge group table 41 in table memory 4 using the port number as a key, obtains, from the received port number, a bridge group identifier to which the reception packet should belong, and writes the bridge group identifier into the bridge group identifier field in the buffer.

Then, bridge processing means 3 selects address learning table $42_k$ (k=1, 2, ..., n) of a MAC address corresponding to the bridge group identifier obtained from bridge group table 41 from table memory 4. More particularly, if the packet has been received from port 1, then bridge processing means 3 recognizes that the packet belongs to the group "A" from the bridge group identifier field of bridge group table 41, and selects address learning table $42_k$ corresponding to the group "A". Then, bridge processing means 3 reads out an SA from the reception data, searches address learning table $42_k$ using the SA as a key and checks whether or not an entry of the SA is present in address learning table $42_k$.

As seen in FIG. 10, address learning table 42 is so structured that a MAC address, a port identification number and an aging counter are held as entries, and an entry is produced dynamically by learning process. If a MAC address entry having an equal value to the SA has been produced already, then the reception port number is set to the port identification number and the aging counter is reset to its initial value to update the MAC address entry. If a MAC address entry which coincides with the SA is not detected, then a new entry is produced, and the reception port number is set to the port identification number and an initial value is set to the aging counter in a similar manner.

Here, the learning process signifies updating process of address learning tables 42 with a MAC address. In the learning process, if a packet received belongs to another bridge group, then address learning table 42 of the MAC address to be searched is address learning table $42_k$ corresponding to the bridge group, and operation in this instance is similar to that for address learning table 42. (j=1, 2, ..., n; j≠k) of other bridge groups.

After learning of the MAC address to address learning table $42_k$ is completed, switching process is performed. The switching process reads out the DA field from within the reception data and searches address learning table $42_k$ using the DA as a key. Selection of address learning table $42_k$ to be searched is similar to that upon learning process.

If a MAC address entry which coincides with the DA is detected in MAC address learning table $42_k$, then the aging counter is checked, and if the aging counter has a value smaller than its limit value, a port number entry is read out from the table. Using the read out port number as a key, bridge group table 41 is searched to confirm that the port number belongs to the bridge group "A". Since learning is performed for each group, incoincidence does not occur in principle, and therefore, this searching process may be omitted.

Thereafter, the obtained port number is set as a transmission destination to the transmission port ID field in the buffer and loads the pointer information into transmission buffer queue 9.

If a MAC address entry which coincides with the DA is not detected in MAC address learning table $42_k$, since a connection position of a destination host has not been learned and is not known, flooding to transmit a packet to all ports which form the same bridge group must be performed.

Also when the DA is a broadcast address or a multi-cast address, the packet is transmitted to all ports in the same bridge group similarly as in flooding. In this instance, a list of all ports to which the packet should be transmitted must be set to the transmission port ID of the buffer. Thereafter, the pointer information is loaded into transmission buffer queue 9.

Usually, if a transmission port is decided, then switching process is performed. However, several exceptions exist.

When a transmission port obtained from an address learning table is the same as a reception port, since the packet need not be relayed, it is abandoned. Further, when a bridge group ID is detected as a port, this signifies a virtual interface with built-in routing processing means 5, and in this instance, the pointer information is loaded into reception buffer queue 10 to deliver the packet to routing processing means 5. This similarly applies to a case wherein a bridge group ID is present in a list of ports to which the packet is to be transmitted in broadcasting process or flooding.

When transmission and reception ports are the same or an error is detected in the second layer of a reception packet, the packet is abandoned. When a packet is to be abandoned, the buffer is initialized and the pointer information is loaded into free buffer queue 7.

According to the IEEE 802.1D standards, each entry of any address learning table 42 is made invalid when a certain time elapses after it is learned last, and must be deleted from the table. The aging process is started periodically by timer interruption and effects maintenance of the aging counters of the individual entries of address learning tables 42. For example, if it is assumed that the valid time of address learning tables 42 is set to 30 seconds after learning and the period of timer interruption is 1 second, then the aging process is started in units of one second and increments the aging counters for all entries of MAC address learning tables 42 by "1". If the initial value of the aging time is set to "0", then an entry with which the valid time has elapsed can be identified and deleted by deleting the entry, if the count value after incremented reaches "30", from the table. If the entry is learned again during the aging incrementing operation, then the count value is reset to the initial value "0". The valid time of MAC address entries can be increased or decreased in units of one second by modifying the initial value. Further, if the starting period for the timer process is set to a smaller value, the resolution of the table aging process can be made finer. However, it must be considered that the CPU time used for table process is increased thereby.

In this working example, a bridge group is first identified from a reception port of a received frame, and learning into and search of MAC address learning table 42 are performed independently of each bridge group. Accordingly, even if terminals having the same MAC address are subordinate to ports belonging to the bridge group "A" and ports belonging to the bridge group "B", since a MAC address entry produced by learning upon reception is produced separately in MAC address learning table $42_k$ and MAC address learning table $42_j$, the MAC address entries of the two terminals can exist simultaneously, and upon switching process, no attention need be paid to such coexistence.

Routing processing means 5 includes routing table 61 shown in FIG. 11 in table memory 6 in order to perform routing selecting process. Routing table 61 stores various information tables set manually from the outside or set dynamically by an upper protocol or an attached protocol.

Here, in order to simplify description of operation, a protocol which allows routing of routing processing means 5 is described as the IP. However, similar process is possible in principle also with a third layer protocol which allows routing.

Routing processing means 5 of the IP realizes, by program control, a routing table maintenance function for maintaining and managing routing information as routing table 61 with a dynamic routing protocol by which routing information of routing processing means 5 itself is communicated with a neighboring host such as a RIP (Routing Information Protocol) protocol, an OSPF (Open Shortest Path First) protocol or the like, a routing control function for performing routing control in accordance with the routing information of routing table 61 and providing a relaying operation in the third layer, and an ARP function for solving, upon transmission of a packet, a next hop IP address or a destination network address of the third layer to a hardware address of the second layer or a lower layer represented by a MAC address.

The CPU or hardware circumstances on which routing processing means 5 runs may be a common CPU to or an independent CPU of that of bridge processing means 3.

Bridge processing means 3 in this working example registers a hardware address of at least one routing processing means 5 as a static entry, which is not erased by aging, in advance in one of MAC address learning tables 42. For this MAC address of routing processing means 5, a value common to different bridge groups may be used only if it is a MAC address unique in the network. A port mapped with the MAC address entry is regarded as a logical virtual LAN interface and is considered to be present one by one for each bridge group. To this interface, a specific number is allocated in advance so that it may be distinguished from physical LAN interface ports. Also this virtual LAN port number is set to bridge group table 41 in order to construct a bridge group similarly to physical LAN ports. Entries of bridge group table 41 are expanded by the number of virtual LAN ports (number of bridge groups). In this working example, bridge group IDs are used for virtual LAN port numbers.

Since bridge processing means 3 sets, upon outputting to a virtual LAN port, a bridge group ID to the output port ID field and loads the output to the virtual LAN port into reception buffer queue 10, a packet destined for a MAC address present in routing processing means 5 is all delivered from one reception buffer queue 10 from whichever bridge group the packet is transmitted.

Since the output port ID value is different for each bridge group, routing processing means 5 recognizes different groups making use of the difference. Accordingly, routing processing means 5 recognizes, as an interface to be routed, not a physical port number but a virtual LAN port number and performs routing process with the virtual LAN port.

Routing processing means 5 extracts, if reception buffer queue 10 is not free, a reception buffer pointer, recognizes an IP packet header field from within the packet and performs checking of a format, a version, a header check sum and so forth to recognize that regular routing is possible with the packet, and thereafter, it extracts a destination network address. Routing processing means 5 searches routing table 61 in table memory 6 using the extracted destination network address as a key to obtain a next hop IP address and a virtual LAN port number for allowing the IP address to be reached. If a result of the search reveals that the destination network address is an IP sub-network connected to routing processing means 5 itself, then the destination network address in the packet is determined directly as a next hop IP address. If the destination network address can be routed via another router, then the IP address of the router is recognized as a next hop IP address and it is written into a required part in the IP packet header, and a check sum is calculated again. Thereafter, ARP table 62 shown in FIG. 12 is searched using the destination network address of the direct route or the next hop ID address as a key.

If a MAC address (hardware address) corresponding to the IP address (network address) is detected in ARP table 62, then the MAC address of the result of search is inserted into the DA and the MAC address allocated exclusively to routing processing means 5 in advance is inserted into the SA to encapsulate the IP packet into a second layer ethernet MAC frame, and a packet length and so forth are set. Thereafter, the bridge group ID as the reception port ID is set as a virtual LAN port number and loaded into transmission buffer queue 11.

If ARP table 62 does not hit, then a free buffer is hunted to produce an ARP request packet, and the next hop IP address is placed into the target IP address to be solved and a broadcast address is set to the DA and besides the MAC address allocated exclusively to routing processing means 5 is inserted into the SA to encapsulate the IP packet into a second layer ethernet MAC frame. Then, after a packet length and so forth are set, the virtual LAN port number obtained upon search of routing table 61 is set as the reception port ID and loaded into transmission buffer queue 11.

An IP packet which cannot have been solved by ARP table 62 is not transmitted until after an ARP reply is sent back and the corresponding MAC address of the next hop IP address is solved.

When contents of the packet are abnormal or no route to the destination is detected in the routing process, the routing process is stopped and the buffer is initialized and returned to free buffer queue 7.

The buffer pointer loaded in transmission buffer queue 11 is read out by bridge processing means 3, and a bridge group is selected referring to reception port identifiers set in the buffer, and then a corresponding MAC learning table is searched to determine a physical port to be used for outputting. This procedure is quite similar to that when a packet is received from a physical port.

Also with routing table 61 shown in FIG. 11 and ARP table 62 shown FIG. 12, aging process is performed with an algorithm similar to that for the aging process of address learning tables 42 of table memory 4 to delete an old entry.

While, in this working example, the LANs connected to LAN controlling means 1 are assumed to be ethernets, switching of any LANs is possible in principle if the LANs have a same hardware address system, that is, if the LANs perform relaying exchanging using a MAC address.

For example, LANs of LAN emulation Client specifications of the IEEE 802.3, IEEE 802.5, FDDI and ATM Forum may be present in a mixed state in LAN controlling means 1.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An internetworking router for a LAN switching hub apparatus comprising:

an address learning table which holds as a set for a certain period of time a source second layer address for a packet received from a plurality of LAN interfaces and the LAN interface of said plurality of LAN interfaces which has received said packet;

a plurality of bridge groups which construct a plurality of virtual LANs by arbitrarily combining those of said plurality of LAN interfaces which can be relayed to each other;

said plurality of bridge groups having said address learning tables for relaying process independently of each other, and bridge processing means which performs learning processing the address learning table of said plurality of bridge groups to which the received packet belongs to;

wherein a destination second layer address is extracted from said received packet and said address learning table is searched using said destination second layer address as a key to specify a LAN interface which corresponds to said destination second layer address from within said plurality of LAN interfaces, and then said packet is relayed and sent out only to said specified LAN interface.

2. An internetworking router according to claim 1, further comprising a plurality of logical interfaces including virtual LAN interfaces and routing processing means for relaying said plurality of logical interfaces;

wherein, when said packet is to be relayed between a first bridge group and a second bridge group from among said plurality of bridge groups, a third logical interface for relaying said first bridge group and said second bridge group from among said plurality of logical interfaces delivers address pointer information to a buffer into which said packet has been stored using a port ID of said virtual LAN interface between said bridge processing means and said routing processing means.

3. An internetworking router according to claim 2, wherein, when said third logical interface from among said plurality of logical interfaces is to deliver the address pointer information to the buffer into which said packet has been stored using the port ID of said virtual LAN interface between said bridge processing means and said routing processing means, said address pointer information is delivered in a multiplexed state into a reception buffer queue or a transmission buffer queue.

* * * * *